United States Patent
Fiveland et al.

(10) Patent No.: US 9,127,615 B2
(45) Date of Patent: Sep. 8, 2015

(54) ENGINE CONTROL SYSTEM IMPLEMENTING LEAN BURN 6-STROKE CYCLE

(75) Inventors: Scott B. Fiveland, Metamora, IL (US); William H. Lane, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 1113 days.

(21) Appl. No.: 13/263,302

(22) PCT Filed: Dec. 17, 2009

(86) PCT No.: PCT/US2009/068458
§ 371 (c)(1),
(2), (4) Date: Mar. 13, 2012

(87) PCT Pub. No.: WO2010/075165
PCT Pub. Date: Jul. 1, 2010

(65) Prior Publication Data
US 2012/0166066 A1    Jun. 28, 2012

Related U.S. Application Data

(60) Provisional application No. 61/193,770, filed on Dec. 22, 2008.

(51) Int. Cl.
*F02B 75/02* (2006.01)
*F02D 41/30* (2006.01)
(Continued)

(52) U.S. Cl.
CPC .......... *F02D 41/3017* (2013.01); *F02B 75/021* (2013.01); *F02D 41/3035* (2013.01); *F02D 41/3058* (2013.01); *F02D 41/402* (2013.01); *F02B 1/12* (2013.01); *F02B 3/06* (2013.01); *F02D 2041/3052* (2013.01); *Y02T 10/44* (2013.01)

(58) Field of Classification Search
CPC .................... F02D 41/3058; F02D 2041/3052; F02B 75/02; F02B 75/021
USPC ............................. 123/64, 295; 701/104, 105
See application file for complete search history.

(56) References Cited

U.S. PATENT DOCUMENTS 4,367,700 A    1/1983    Pace
5,699,758 A    12/1997   Clarke
(Continued)

OTHER PUBLICATIONS

International Search Report for PCT/2009/068458, Apr. 26, 2010, 3 pp.

(Continued)

*Primary Examiner* — Erick Solis
(74) *Attorney, Agent, or Firm* — Leydig, Voit & Mayer, Ltd.

(57) ABSTRACT

A control system (12) for an engine (10) having a combustion chamber (22) is disclosed. The control system may have a fuel injector (40) configured to selectively inject fuel into the combustion chamber, and a controller (54) in communication with the fuel injector. The controller may be configured to activate the fuel injector during a first compression stroke to initiate fuel injection in an amount and at a timing that results in a stratified lean air/fuel mixture within the combustion chamber during a first combustion event of a six-stroke cycle. The controller may also be configured to activate the fuel injector during a first power stroke to initiate fuel injection in an amount and at a timing that results in a homogenous lean air/fuel mixture within the combustion chamber during a second combustion event of the same six-stroke cycle.

6 Claims, 2 Drawing Sheets

(51) Int. Cl.
*F02D 41/40* (2006.01)
*F02B 1/12* (2006.01)
*F02B 3/06* (2006.01)

(56) References Cited

U.S. PATENT DOCUMENTS

| | | | |
|---|---|---|---|
| 6,363,907 | B1 | 4/2002 | Arai et al. |
| 6,443,108 | B1 | 9/2002 | Brehob et al. |
| 6,523,504 | B2 | 2/2003 | Miura |
| 6,619,241 | B2 | 9/2003 | Otterspeer et al. |
| 6,622,690 | B2 | 9/2003 | Ando et al. |
| 6,705,300 | B2 | 3/2004 | Allmendinger et al. |
| 6,758,170 | B1 | 7/2004 | Walden |
| 6,758,174 | B1 | 7/2004 | Fuerhapter |
| 6,966,309 | B1 * | 11/2005 | Roberts et al. ............ 123/568.14 |
| 6,971,338 | B2 | 12/2005 | Kobayashi et al. |
| 7,334,549 | B2 | 2/2008 | Lewis et al. |
| 7,426,916 | B2 | 9/2008 | Reed et al. |
| 2002/0000209 | A1 | 1/2002 | Ando et al. |
| 2004/0123822 | A1 | 7/2004 | Fuerhapter |
| 2006/0005788 | A1 | 1/2006 | Kuo et al. |
| 2007/0044778 | A1 * | 3/2007 | Milovanovic et al. ... 123/568.14 |
| 2008/0098969 | A1 * | 5/2008 | Reed et al. ...................... 123/64 |
| 2008/0264393 | A1 | 10/2008 | Sturman |

OTHER PUBLICATIONS

Written Opinion for PCT/2009/068458, Apr. 26, 2010, 5 pp.

* cited by examiner

ENGINE CONTROL SYSTEM IMPLEMENTING LEAN BURN 6-STROKE CYCLE

TECHNICAL FIELD

The present disclosure is directed to an engine control system and, more particularly, to an engine control system implementing a lean burn six-stroke combustion cycle.

BACKGROUND

Six-stroke engine cycles are known in the art, and consist generally of an intake stroke, a first compression stroke, a first power stroke, a second compression stroke, a second power stroke, and an exhaust stroke. During the intake stroke, air or a mixture of fuel and air is drawn into an engine's combustion chamber. During the first compression stroke, the mixture is compressed and, toward an end of the first compression stroke, ignited. During the first power stroke, the burning mixture causes the volume of the combustion chamber to expand rapidly by pushing an associated piston downward, thereby creating useful mechanical work output. During the second compression stroke, residual combustion gases and/or new fuel and air are again pressurized and ignited. During the second power stroke, the burning mixture again expands the volume of the combustion chamber to create useful mechanical work output. During the exhaust stroke, byproducts of the combustion processes are pushed from the combustion chamber by the piston.

Historically, both of the combustion events described above (i.e., the combustion events occurring during the first and second power strokes) have been similar during a single cycle. That is, the air/fuel mixture combusting during both events has had substantially the same ratio of air-to-fuel. To provide this same ratio, engine controls such as valve timing and fuel injection are maintained generally consistent during the different combustion events by way of mechanical cam mechanisms. Although effective, this operation may be less than optimal with regard to efficiency, power, and exhaust emissions.

One attempt to improve operation of a six-stroke engine is disclosed in US Patent Publication No. 2007/0044778 (the '778 publication) by Milovanovic et al. published on 1 Mar. 2007. The '778 publication describes a direct injected engine having a first stage of combustion and a second stage of combustion. During the first stage of combustion, a rich ratio of fuel and air are supplied to a combustion chamber of the engine and combusted by a compression ignition diesel process. A majority of the combusted gases resulting from the first stage of combustion are retained in the combustion chamber, and additional air is supplied to the combustion chamber. The resulting mixture having a lean ratio is then combusted during a second combustion stage by homogenous charge compression ignition. The first stage of combustion, because of its rich nature may provide increased power output, while the second stage, because of its lean nature, may reduce exhaust emissions.

Although the '778 publication may provide for enhanced performance of an engine during six-stroke operation, it may still be less than optimal. Specifically, the rich ratio of fuel and air during the first stage of combustion may produce exhaust emissions in an amount too great to be sufficiently reduced during the second stage of combustion.

The engine control system of the present disclosure solves one or more of the problems set forth above and/or other problems of the prior art.

SUMMARY OF THE DISCLOSURE

In one aspect, the present disclosure is directed to a control system for an engine having a combustion chamber. The control system may include a fuel injector configured to selectively inject fuel into the combustion chamber, and a controller in communication with the fuel injector. The controller may be configured to activate the fuel injector during a first compression stroke to initiate fuel injection in an amount and at a timing that results in a stratified lean air/fuel mixture within the combustion chamber during a first combustion event of a six-stroke cycle. The controller may also be configured to activate the fuel injector during a first power stroke to initiate fuel injection in an amount and at a timing that results in a homogenous lean air/fuel mixture within the combustion chamber during a second combustion event of the same six-stroke cycle.

In another aspect, the present disclosure is directed to a method of operating an engine. The method may include drawing in air, compressing the air, and injecting fuel into the compressed air to create a stratified lean air/fuel mixture. The method may also include igniting the stratified lean air/fuel mixture to generate a first work output, injecting fuel into residual combustion gases during the first work output to create a homogenous lean air/fuel mixture, and compressing the homogenous lean air/fuel mixture. The method may further include igniting the compressed homogenous lean air/fuel mixture to generate a second work output, and exhausting residual gases from combustion of the homogenous lean air/fuel mixture to the environment.

DETAILED DESCRIPTION

Figure 1:
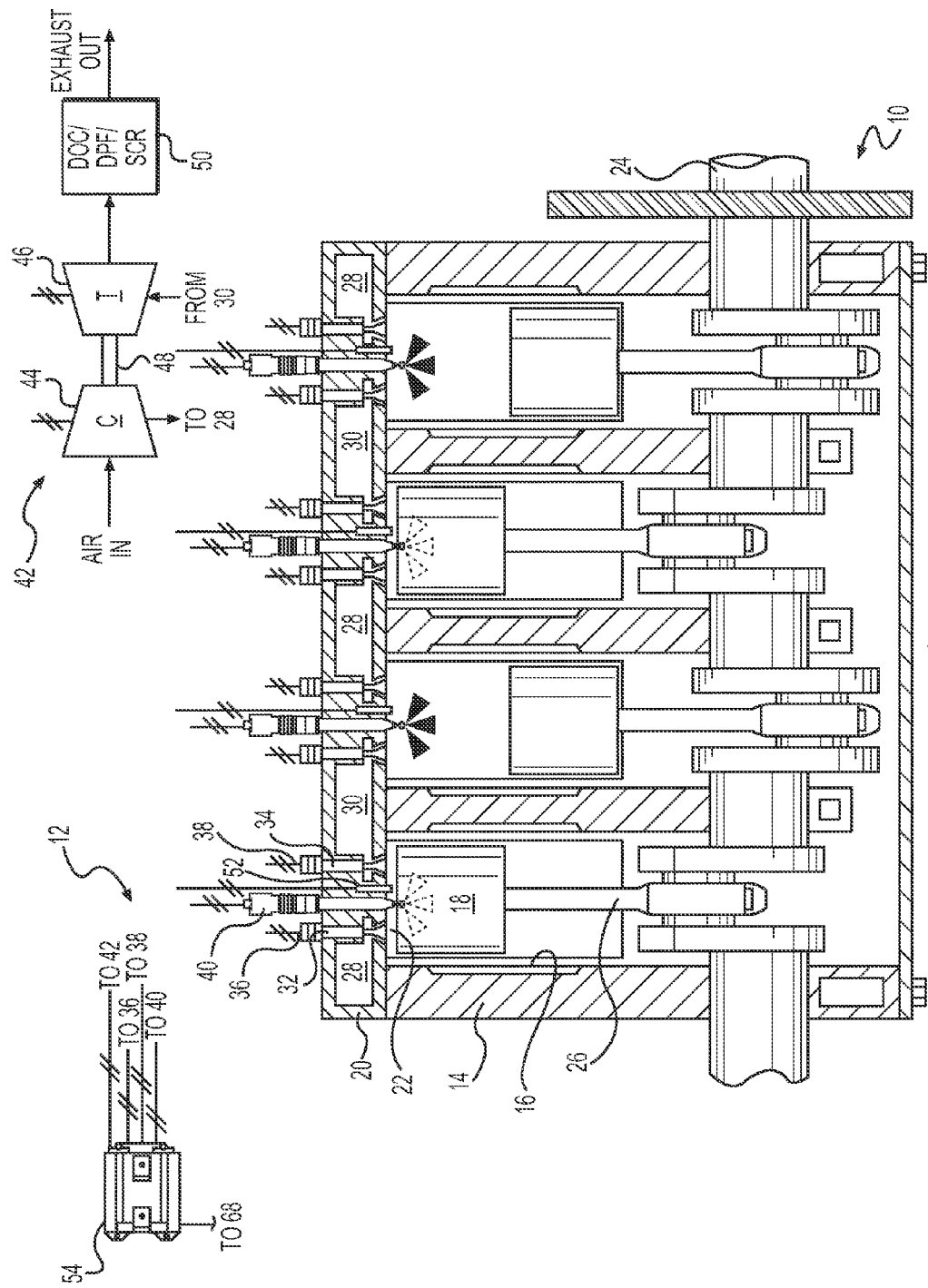
FIG. 1 is a schematic illustration of an exemplary disclosed power system.

FIG. 1 illustrates an exemplary embodiment of a power system 10 having an engine control system 12. For the purposes of this disclosure, power system 10 is depicted and described as a six-stroke diesel engine. One skilled in the art will recognize, however, that power system 10 may embody any type of combustion engine such as, for example, a gasoline engine or a gaseous fuel-powered engine. Engine control system 12 may help regulate operation of power system 10.

Power system 10 may include an engine block 14 that at least partially defines a plurality of cylinders 16. A piston 18 and a cylinder head 20 may be associated with each cylinder 16 to form a combustion chamber 22. Specifically, piston 18 may be slidably disposed within each cylinder 16 to reciprocate between a top-dead-center (TDC) position and a bottom-dead-center (BDC) position, and cylinder head 20 may be positioned to cap off an end of cylinder 16, thereby forming combustion chamber 22. In the illustrated embodiment, power system 10 includes four combustion chambers 22. However, it is contemplated that power system 10 may include a greater or lesser number of combustion chambers 22 and that combustion chambers 22 may be disposed in an "in-line" configuration, a "V" configuration, or in any other suitable configuration.

Power system 10 may also include a crankshaft 24 rotatably disposed within engine block 14. A connecting rod 26 may connect each piston 18 to crankshaft 24 so that a sliding motion of piston 18 between the TDC and BDC positions within each respective cylinder 16 results in a rotation of crankshaft 24. Similarly, a rotation of crankshaft 24 may result in a sliding motion of piston 18 between the TDC and BDC positions. In a six-stroke engine, piston 18 may reciprocate between the top-dead-center and bottom-dead-center positions through an intake stroke, a first compression stroke, a first power stroke, a second compression stroke, a second power stroke, and an exhaust stroke.

Cylinder head 20 may define an intake passageway 28 and an exhaust passageway 30 associated with each combustion chamber 22. Intake passageway 28 may direct air into combustion chamber 22. Exhaust passageway 30 may direct exhaust gases from combustion chamber 22 to the atmosphere.

An intake valve 32 may be disposed within an opening of intake passageway 28 to selectively engage a seat. Specifically, intake valve 32 may be movable between a first position at which intake valve 32 engages the seat to inhibit a flow of fluid through the opening, and a second position at which intake valve 32 is moved away from the seat to allow a flow of fluid through the opening into combustion chamber 22.

Similarly, an exhaust valve 34 may be disposed within an opening of exhaust passageway 30 to selectively engage a seat. Exhaust valve 34 may be movable between a first position at which exhaust valve 34 engages the seat to inhibit a flow of fluid through the opening, and a second position at which exhaust valve 34 is moved away from the seat to allow a flow of fluid through the opening from combustion chamber 22.

A series of valve actuation assemblies 36 may be operatively engaged with cylinder head 20 to move intake valves 32 between the first and second positions. Another series of valve actuation assemblies 38 may be provided to move exhaust valves 34 between the first and second positions, if desired. It should be noted that each cylinder head 20 could include multiple intake openings and multiple exhaust openings, and that each such opening would have an associated valve. As such, power system 10 may include at least one valve actuation assembly 36 or 38 for each cylinder head 20 that is configured to actuate all of the intake valves 32 or all of the exhaust valves 34 of that cylinder head 20. It is also contemplated that a single valve actuation assembly (not shown) could actuate the intake valves 32 associated with multiple cylinder heads 20, if desired. One or both of valve actuation assemblies 36, 38 may be associated with a common cam assembly (not shown) operatively driven by crankshaft 24 for inducing a cyclical movement between the first and second positions. In some embodiments, valve actuation assemblies 36, 38 may be capable of independently providing variable opening and closing timings of intake and/or exhaust valves 32, 34, if desired, to thereby adjust an air/fuel ratio, EGR flow rate, boost pressure, etc. of power system 10.

Power system 10 may also include a fuel injector 40 associated with each combustion chamber 22. Each fuel injector 40 may be disposed within a cylinder head 20 and operable to inject fuel into the associated combustion chamber 22 at predetermined timings, pressures, and quantities to affect a power output and/or exhaust emissions of power system 10. Fuel injector 40 may embody any type of electronically controlled fuel injection device such as, for example, an electronically actuated—electronically controlled injector, a mechanically actuated—electronically controlled injector, a digitally controlled fuel valve associated with a high pressure common rail (not shown), or any other type of fuel injector known in the art.

Pressurized air may be mixed with the fuel prior to or after the air enters power system 10 to promote combustion within combustion chamber 22. The air may be pressurized by, for example, a turbocharger 42. Turbocharger 42 may include a compressor 44 connected to a turbine 46 by way of a common shaft 48. As exhaust exiting power system 10 passes through turbine 46, shaft 48 may be driven by the exiting exhaust to rotate compressor 44 and pressurize inlet air. In some embodiments, turbocharger 42 may be a variable geometry turbocharger (VGT), wherein components of compressor 44 and/or turbine 46 may be adjusted to affect a characteristic of air (e.g., a boost pressure, a flow rate, an air/fuel ratio, etc.) entering power system 10 and/or a characteristic of exhaust exiting power system 10.

After the exhaust from power system 10 passes through and drives operation of turbocharger 42, it may be directed through one or more exhaust emissions control devices 50 and conditioned before being released to the atmosphere. Specifically, the exhaust may be directed through a conversion catalyst, for example a diesel oxidation catalyst (DOC), through a filter, for example a diesel particulate filter (DPF), through a reduction catalyst, for example an SCR device, and/or through other treatment devices and attenuation known in the art. Each of these devices may be controlled to selectively convert, capture, and/or reduce a particular constituent of the exhaust.

Control system 12 may regulate operations of power system 10 to increase power and efficiency, while reducing exhaust emissions. Specifically, control system 12 may include a controller 54 in communication with fuel injector 40, variable valve actuators 36 and 38, and/or turbocharger 42. Controller 54 may be configured to selectively actuate any one or all of these components to affect combustion events within a single cycle of power system 10 and/or cycle-to-cycle operational changes of power system 10, as will be described in more detail below.

Controller 54 may embody a single microprocessor or multiple microprocessors that include a means for controlling operations of power system 10. Numerous commercially available microprocessors can be configured to perform the functions of controller 54. It should be appreciated that controller 54 could readily embody a general power source microprocessor capable of controlling numerous power source functions. Controller 54 may include all the components required to run an application such as, for example, a memory, a secondary storage device, and a processor, such as a central processing unit or any other means known in the art for controlling the components of power system 10. Various known circuits may be associated with controller 54, including power supply circuitry, signal-conditioning circuitry, solenoid driver circuitry, communication circuitry, and other appropriate circuitry.

One or more maps relating power source performance to operational adjustments and/or settings of power source components may be stored within the memory of controller 54. Each of these maps may be in the form of tables, graphs, algorithms, and/or equations. In one example, the maps may be used for maintaining performance of power system 10 compliant with operator expectations, manufacturer guidelines, and/or with emission regulations. During operation of power system 10, controller 54 may be configured to reference these maps and determine appropriate operational settings for power system 10 that cause power system 10 to perform as expected. Controller 54 may also be configured to record the performance of power system 10 and the operational settings thereof into the maps to create a history of the performance and associated settings, if desired.

Figure 2:
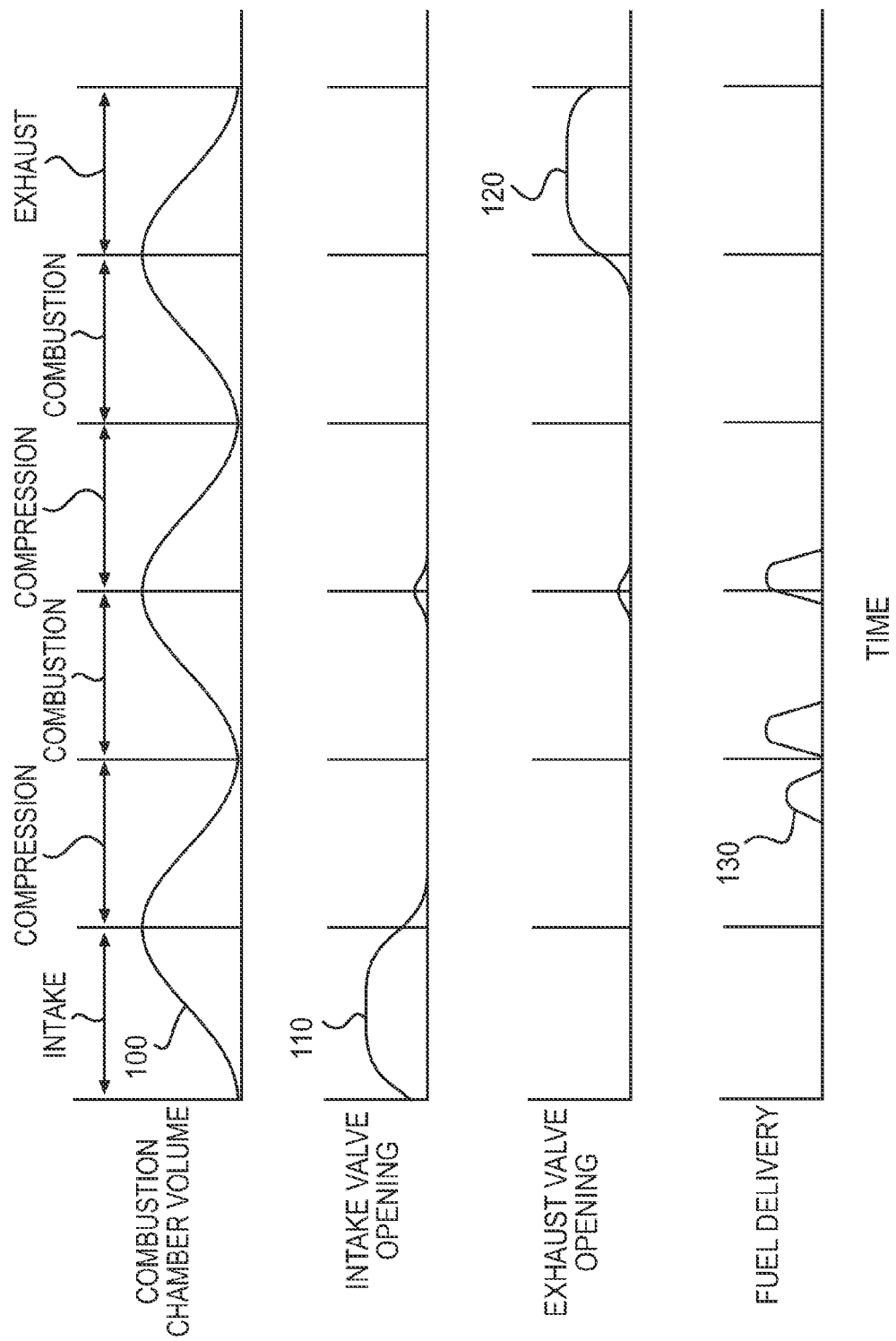
FIG. 2 is graph depicting exemplary operation of the power system of FIG. 1.

FIG. 2 illustrates a graph depicting operation of power system 10, as regulated by controller 54. Specifically, the graph of FIG. 2 depicts four different traces, including a combustion chamber volume trace 100, an intake valve opening trace 110, an exhaust valve opening trace 120, and a fuel delivery trace 130, each of these traces being plotted against time during an exemplary six-stroke cycle of power system 10. FIG. 2 will be discussed in the following section to further illustrate the disclosed concepts.

INDUSTRIAL APPLICABILITY

The disclosed engine control system may be applicable to any combustion power source where a performance output thereof benefits from variations in combustion events of a single cycle and/or from changes between cycles. In particular, the disclosed engine control system may improve performance of power system 10 by adjusting air/fuel ratios, timings, and mixing within a single engine cycle, and/or between cycles. The operation of control system 12 will now be explained.

As illustrated in the graph of FIG. 2, trace 100 shows expansion and contraction of the volume of combustion chamber 22 during movement of crankshaft 24, connecting rods 26, and pistons 18. In particular, trace 100 illustrates piston 18 being reciprocated by crankshaft 24 from the TDC position to the BDC position during an intake stroke, from the BDC position to the TDC position during a first compression stroke, from the TDC position to the BDC position during a first combustion or power stroke, from the BDC position to the TDC position during a second compression stroke, from the TDC position to the BDC position during a second combustion or power stroke, from the TDC position to the BDC position during a second combustion or power stroke, and from the BDC position to the TDC position during an exhaust stroke. In this manner, power system 10 may be operated in a six-stroke engine cycle, which includes additional compression and power strokes over the conventional four-stroke engine cycle.

During the movement of piston 18 described above, controller 54 may selectively open and close intake valve 32 to allow air or a mixture of air and fuel into combustion chamber 22. For example, trace 110 shows intake valve 32 opening near a start of the intake stroke, and closing near an end of the intake stroke. In some situations, however, intake valve 32 may also open and close near an end of the first combustion stroke and/or near a start of the second compression stroke to either allow exhaust to be pushed out of combustion chamber 22 and into an associated intake manifold for subsequent recirculation, or to allow additional air or air/fuel mixture into combustion chamber 22 for the ensuing second compression and combustion strokes.

Exhaust valve 34 may also be selectively opened and closed by controller 54 during movement of piston 18 to allow exhaust to pass from combustion chamber 22 to the atmosphere. For example, trace 120 shows exhaust valve 34 opening near a start of the exhaust stroke, and closing near an end of the exhaust stroke. In some situations, however, exhaust valve 34 may also open and close near an end of the first combustion stroke and/or near a start of the second compression stroke to allow a minor portion of residual combustion gases from the first combustion event (i.e., the time during which fuel and air are first combusted within a single six-stroke cycle) to be pushed out of combustion chamber 22. This additional opening of exhaust valve 34 may help regulate peak cylinder pressures during the second combustion event (i.e., the second time during which fuel and air are combusted within a single six-stroke cycle). Thus, in some embodiments, the intake valve 32, the exhaust valve 34, or both the intake and exhaust valves may open and close near an end of the first combustion stroke and/or near a start of the second compression stroke Fuel injector 40 may be similarly activated by controller 54 to inject fuel at desired timings with respect to movement of piston 18 and in desired amounts. For example, trace 130 shows a first injection event occurring near an end of the first compression stroke and a beginning of the first combustion stroke. This injection event may include any number of discrete injections, including a pre-injection, a larger main injection, and one or more smaller post injections of fuel. The first injection event may result in a generally stratified lean air/fuel mixture within combustion chamber 22, which may be subsequently compression ignited. In one example, the stratified lean air/fuel mixture may have a ratio of air-to-fuel of about 14.7-30.

Trace 130 also shows a second injection event occurring near an end of the first combustion stroke and/or a beginning (e.g., during a first half) of the second compression stroke. This second injection event may be initiated by controller 54, similar to the first injection event, to include any number of discrete injections of fuel. The second injection event may result in a generally homogeneous lean air/fuel mixture within combustion chamber 22, which may be subsequently compression ignited. In one example, the lean air/fuel mixture resulting from the second injection event may be relatively leaner than the lean air/fuel mixture resulting from the first injection event. That is, the second injection event may result in an ultra-lean air/fuel mixture having a ratio of air-to-fuel of about 30 or higher. This ultra-lean air/fuel ratio may help to remove or otherwise reduce exhaust constituents remaining from the first combustion event. It is contemplated that, in some situations, the second injection event may be omitted, and only residual gases from the first combustion event ignited during the second combustion event, if desired.

Because control system 12 may be used to implement a six-stroke engine cycle having lean and ultra-lean combustion events, operation of power system 10 may be improved. In particular, the first lean combustion event may result in high-efficiency, while the second ultra-lean combustion event may result in low emissions.

It will be apparent to those skilled in the art that various modifications and variations can be made to the disclosed engine control system. Other embodiments will be apparent to those skilled in the art from consideration of the specification and practice of the disclosed engine control system. For example, although illustrated and described with respect to transition between four-stroke and six-stroke operation, it is contemplated that cam transmission 25 may similarly be utilized to transition between any number of strokes. It is intended that the specification and examples be considered as exemplary only, with a true scope being indicated by the following claims and their equivalents.

The invention claimed is:

1. A control system for an engine having a combustion chamber, at least one engine valve that includes an intake valve and an exhaust valve associated with the combustion chamber, and a variable valve actuator configured to selectively open and close the at least one engine valve, the control system comprising:

a fuel injector configured to selectively inject fuel into the combustion chamber; and a controller in communication with the variable valve actuator and the fuel injector and being configured to:

activate the fuel injector to perform a first injection during a first compression stroke to initiate fuel injection in an amount and at a timing that results in a stratified lean air/fuel mixture within the combustion chamber during a first combustion event of a six-stroke cycle;

activate the fuel injector to perform a second injection during a first power stroke to initiate fuel injection in an amount and at a timing that results in a homogenous lean air/fuel mixture within the combustion chamber during a second combustion event of the same six-stroke cycle; and activate the fuel injector to perform a third injection during an end of the first power stroke and a beginning of a second power stroke of the same six-stroke cycle;

activate the variable valve actuator to regulate the intake valve to supply compressed air to the combustion chamber during an intake stroke and during at least one of an end portion of the first power stroke and a start portion of the second compression stroke;

activate the variable valve actuator to regulate the exhaust valve to release a minor portion of residual combustion gases from the first combustion event during at least one of the end portion of the first power stroke and the start portion of a second compression stroke.

2. The control system of claim 1, wherein both the first and second combustion events are compression ignited.

3. The control system of claim 1, wherein the homogenous lean air/fuel mixture is leaner than the stratified lean air/fuel mixture.

4. A method of operating an engine, comprising:

drawing in air;

compressing the air;

injecting fuel during a first injection into the compressed air to create a stratified lean air/fuel mixture;

igniting the stratified lean air/fuel mixture to generate a first work output;

injecting fuel during a second injection into residual combustion gases during the first work output to create a homogenous lean air/fuel mixture;

compressing the homogenous lean air/fuel mixture;

injecting fuel during a third injection into the homogeneous lean air/fuel mixture while it is being compressed;

igniting the compressed homogenous lean air/fuel mixture to generate a second work output; and exhausting residual gases from combustion of the homogenous lean air/fuel mixture to the environment.

5. The method of claim 4, wherein igniting the stratified and homogenous lean air/fuel mixtures includes compression igniting.

6. The method of claim 4, wherein the homogenous lean air/fuel mixture is leaner than the stratified lean air/fuel mixture.

* * * * *